US012775512B2

(12) United States Patent
Bower, III et al.

(10) Patent No.: US 12,775,512 B2
(45) Date of Patent: Oct. 27, 2026

(54) TRANSFERRING WORKLOAD FROM A BASEBOARD MANAGEMENT CONTROLLER TO A SMART NETWORK INTERFACE CONTROLLER

(71) Applicant: Lenovo Enterprise Solutions (Singapore) Pte Ltd., Singapore (SG)

(72) Inventors: Fred Allison Bower, III, Durham, NC (US); Caihong Zhang, Shanghai (CN); Ming Lei, Shanghai (CN); Chenyan He, Shanghai (CN)

( * ) Notice: Subject to any disclaimer, the term of this patent is extended or adjusted under 35 U.S.C. 154(b) by 61 days.

(21) Appl. No.: 18/487,201

(22) Filed: Oct. 16, 2023

(65) Prior Publication Data

US 2024/0362099 A1 Oct. 31, 2024

Related U.S. Application Data

(63) Continuation of application No. PCT/CN2023/090776, filed on Apr. 26, 2023.

(51) Int. Cl.
*G06F 11/07* (2006.01)

(52) U.S. Cl.
CPC ...... *G06F 11/0754* (2013.01); *G06F 11/0709* (2013.01); *G06F 11/0772* (2013.01)

(58) Field of Classification Search
CPC ............. G06F 11/0754; G06F 11/0709; G06F 11/0772
See application file for complete search history.

(56) References Cited

U.S. PATENT DOCUMENTS

2014/0115137 A1* 4/2014 Keisam .................. H04L 41/04 709/223
2016/0342499 A1 11/2016 Cheng et al.
(Continued)

FOREIGN PATENT DOCUMENTS

CN 109254895 A 1/2019
CN 109558284 A 4/2019
(Continued)

OTHER PUBLICATIONS espacenet.com, English translation of CN 110765486 A, Feb. 7, 2020, Abstract.
(Continued)

*Primary Examiner* — Jigar P Patel
(74) *Attorney, Agent, or Firm* — Jeffrey L. Streets

(57) ABSTRACT

A baseboard management controller (BMC) may obtain hardware performance data for hardware devices installed in a server that includes the BMC, provide the hardware performance data to a smart network interface controller (Smart NIC) in the server, and receive from the Smart NIC a hardware failure alert that identifies a hardware device predicted to experience a failure based on the hardware performance data. Optionally, the BMC may access a container stored in firmware of the BMC, wherein the container includes a software application such as an artificial intelligence engine trained for hardware failure prediction. The BMC may copy the container to the Smart NIC for running the software application to analyze the hardware performance data and generate a hardware failure alert. The BMC may receive the alert and output a user notification identifying the hardware device that is subject to the alert.

20 Claims, 5 Drawing Sheets

(56) References Cited

U.S. PATENT DOCUMENTS

| | | | | |
|---|---|---|---|---|
| 2022/0043697 | A1* | 2/2022 | Gupta | G06F 9/546 |
| 2023/0023229 | A1* | 1/2023 | Kumar | G06F 3/0673 |
| 2024/0036999 | A1* | 2/2024 | Aurongzeb | G06F 9/5055 |
| 2024/0070065 | A1* | 2/2024 | Hoang | G06F 12/0292 |
| 2024/0134765 | A1* | 4/2024 | Mink | G06F 11/3058 |

FOREIGN PATENT DOCUMENTS

| | | | |
|---|---|---|---|
| CN | 110765486 | A | 2/2020 |
| CN | 111124852 | A | 5/2020 |
| CN | 113901530 | A | 1/2022 |

OTHER PUBLICATIONS espacenet.com, English translation of CN 109254895 A, Jan. 22, 2019, Abstract.

espacenet.com, English translation of CN 113901530 A, Jan. 7, 2022, Abstract.

espacenet.com, English translation of CN 109558284 A, Apr. 2, 2019, Abstract.

Yiming Qui, Jairong Xing, Kuo-Feng Hsu, Qiao Kang, Ming Liu, Srinivas Narayana, and Ang Chen, "Automated SmartNIC Offloading Insights for Network Functions", SOSP '21, Oct. 26-28, 2021, aCM ISBN 978-1-4503-8709-5/21/10, Association for Computing Machinery, https://doi.org/10/1145/3477132.3483583.

The International Bureau of WIPO, International Search Report and Written Opinion for International Application PCT/CN2023/090776 filed on Apr. 26, 2023; mailed on Jan. 2, 2024.

* cited by examiner

TRANSFERRING WORKLOAD FROM A BASEBOARD MANAGEMENT CONTROLLER TO A SMART NETWORK INTERFACE CONTROLLER

BACKGROUND

The present disclosure relates to systems, methods and computer program products for managing workload assigned to a baseboard management controller.

BACKGROUND OF THE RELATED ART

A Baseboard Management Controller (BMC) is the central management module on a server. The BMC manages the interface between system management software and platform hardware. The BMC monitors various types of sensors built into the server and can provide alerts to a system administrator over a network. Furthermore, a remote system administrator may communicate with the BMC over the network to cause the BMC to take corrective actions within the server. The vast utility of the BMC has, however, led to a growing number of management tasks being performed by the BMC. Unfortunately, the increasing load on the BMC may cause latency of some services performed by the BMC.

BRIEF SUMMARY

Some embodiments provide a computer program product comprising a non-volatile computer readable medium and non-transitory program instructions embodied therein, the program instructions being configured to be executable by a processor of a baseboard management controller to cause the processor to perform various operations. The operations comprise obtaining hardware performance data for hardware devices installed in a server that includes the baseboard management controller, providing the hardware performance data to a smart network interface controller that is installed in the server, and receiving a hardware failure alert from the smart network interface controller, wherein the hardware failure alert identifies at least one of the hardware devices predicted to experience a failure based on the hardware performance data.

Some embodiments provide a method comprising a baseboard management controller accessing a container stored in firmware of the baseboard management controller, wherein the container includes a software application for performing hardware failure prediction. The method further comprises the baseboard management controller copying the container to a smart network interface controller, wherein the baseboard management controller and the smart network are installed in a server. Still further, the method comprises the baseboard management controller periodically obtaining hardware performance data for hardware devices installed in the server, the baseboard management controller providing the hardware performance data to the smart network interface controller, and the smart network interface controller running the software application to analyze the hardware performance data provided by the baseboard management controller and generate a hardware failure alert. In addition, the method comprises the baseboard management controller receiving the hardware failure alert from the smart network interface controller, and the baseboard management controller outputting a user notification identifying at least one of the hardware devices that is subject to the hardware failure alert. In one option, the software application may be an artificial intelligence engine having an artificial intelligence model has been trained for memory failure prediction. In another option, the method may further include the baseboard management controller discovering the smart network interface controller that is installed in the server, wherein the container is copied to the smart network interface controller in response to discovering the smart network interface controller.

DETAILED DESCRIPTION

Figure 1:
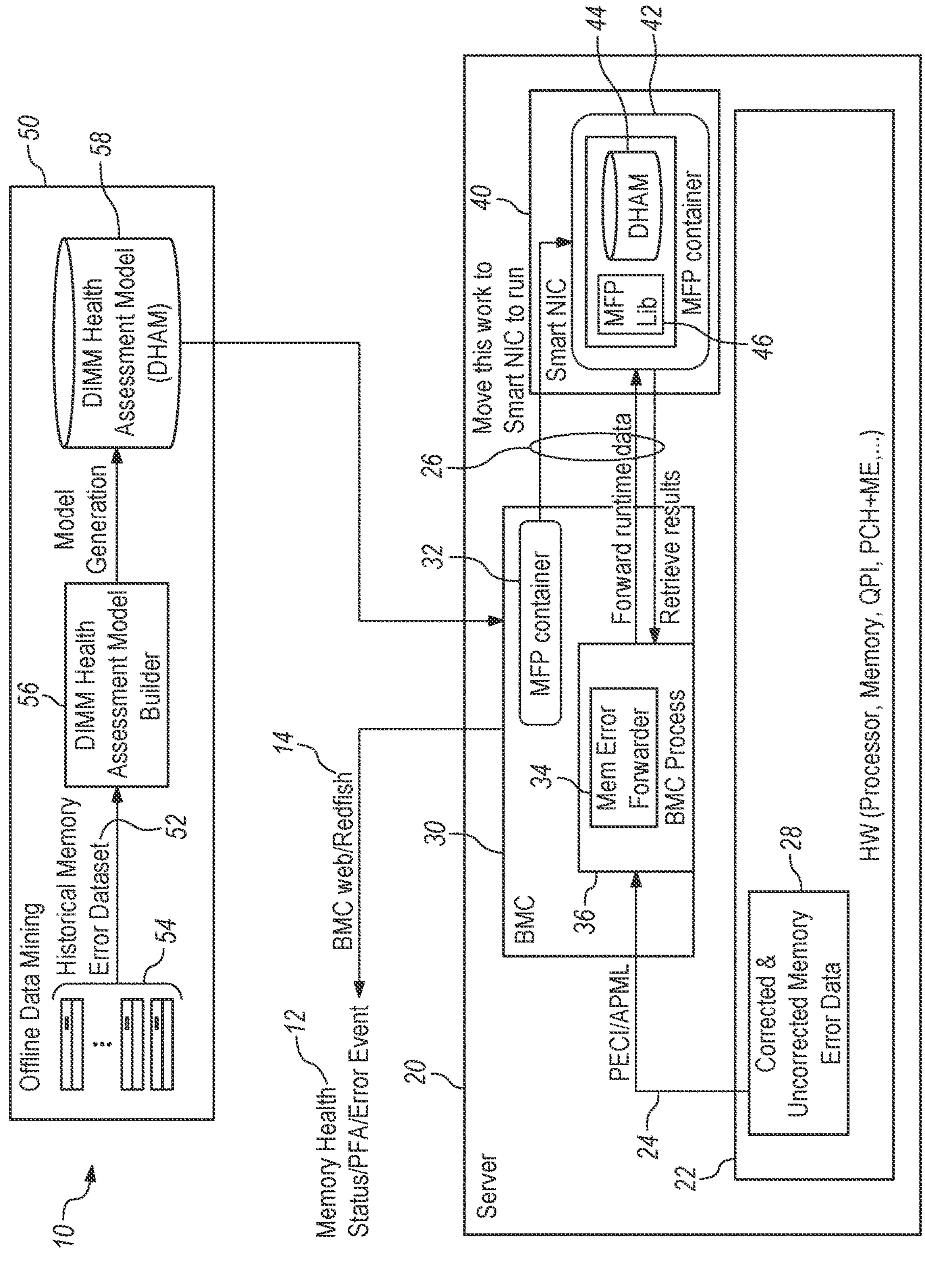
FIG. 1 is a diagram of a system including a server that has a baseboard management controller (BMC) in communication with a smart network interface controller (Smart NIC).

Some embodiments provide a computer program product comprising a non-volatile computer readable medium and non-transitory program instructions embodied therein, the program instructions being configured to be executable by a processor of a baseboard management controller to cause the processor to perform various operations. The operations comprise obtaining hardware performance data for hardware devices installed in a server that includes the baseboard management controller, providing the hardware performance data to a smart network interface controller that is installed in the server, and receiving a hardware failure alert from the smart network interface controller, wherein the hardware failure alert identifies at least one of the hardware devices predicted to experience a failure based on the hardware performance data.

The baseboard management controller (BMC) is a component of a server that manages the interface between system management software and hardware devices installed in the server. Embodiments may include a smart network interface controller (Smart NIC) that is also installed in the server. For example, the BMC may be installed on the motherboard of the server and the Smart NIC may be an option card with a card edge connector that is selectively receivable in a slot on the motherboard or other printed circuit board in the server. The BMC may monitor various types of sensors built into the server and may provide alerts to a system administrator over a network. A processor or CPU on the BMC and a processor or CPU on the Smart NIC both work independent of the host processor or CPU of the server.

The BMC may periodically obtain hardware performance data from various hardware components of the server, such as memory modules or input/output devices. The hardware performance data may be any measured quantity of performance that is relevant to a hardware failure prediction software application. The nature of the hardware performance data may vary according to the type of hardware device and the most-common failure modes for the hardware device. However, the hardware performance data is preferable data that is already made available by existing hardware devices and/or existing sensors that monitor the hardware devices. In one non-limiting example, the hardware component is a memory module, and the hardware performance data includes memory error data. Optionally, the memory error data may identify the specific memory module that experienced the memory error and may identify a type of the memory error. The specific memory model may be identified in many ways, such as by a serial number and/or a slot location where the memory module is installed. The type of memory error may identify the severity of the error, such as indicating whether the error was or was not able to be corrected. In another example, the hardware performance data may be a measure of wear on the hardware device, such as the number of write cycles on a flash memory device.

After obtaining the hardware performance data, the baseboard management controller may send the hardware performance data to the Smart NIC for processing by a software application, such as an artificial intelligence (AI) engine. Accordingly, the Smart NIC includes a general-purpose central processing unit (CPU) that runs the software application to process the hardware performance data as input and predict a hardware device failure. If the software application predicts a hardware device failure, then the Smart NIC may send a hardware failure alert to the baseboard management controller. The hardware failure alert preferably identifies a specific hardware device that is predicted to fail. The BMC may then notify a host device and/or user of the predicted failure of a specific memory device or module, such that the host device or user may repair or replace the affected hardware.

In some embodiments, the BMC and the Smart NIC may communicate over a direct connection, perhaps using a network controller sideband interface (NC-SI) or a Management Component Transport Protocol (MCTP) to transfer hardware performance data and/or the software application from the BMC to the Smart NIC and/or hardware failure prediction results or output from the Smart NIC to the BMC. NC-SI is an electrical interface and protocol defined by the Distributed Management Task Force (DMTF) that enables connection of a BMC to one or more network interface controllers (NICs) in a server for the purpose of enabling out-of-band system management. For example, the NC-SI allows the BMC to use the network connections of the NIC ports for the management traffic, in addition to the regular host traffic. MCTP is a protocol designed by the DMTF to support communications between different intelligent hardware components that make up a platform management subsystem, providing monitoring and control functions inside a managed computer system.

In some embodiments, the output (results) produced by the software application may be sent from the Smart NIC to the BMC or may be retrieved by the BMC from the Smart NIC. The manner in which the output is transferred between the Smart NIC and the BMC may, without limitation, be selected based on an amount of time needed by the Smart NIC to analyze the hardware performance data and produce the output or result.

In some embodiments, the software application may be included in a container. A container is a package of software that contains all of the necessary elements to run in any environment so that the container may be run anywhere. For example, in addition to the software application itself, the container may include only those portions of an operating system that are required to run the software application, such as particular system tools, system libraries and settings. The size of the container is minimized by excluding portions of the operating system that would not be utilized to run the particular software application in the container. Optionally, the container may be stored in firmware of the baseboard management controller.

In some embodiments, the operations may further include accessing a container that includes a software application for performing hardware failure prediction and copying the container to the smart network interface controller. For example, where the container is stored in the firmware of the baseboard management controller, the baseboard management controller may read the container from the firmware and transfer a copy of the container to the smart network interface controller. The Smart NIC may then store the container in memory and perform the software application provided in the container at any subsequent time. Optionally, the Smart NIC may periodically perform the software application to predict hardware failures, such as in response to receiving additional hardware performance data from the baseboard management controller.

In some embodiments, the software application may perform hardware failure prediction, such as memory failure prediction (MFP). Optionally, the software application may include an artificial intelligence (AI) model for hardware failure prediction, where the AI model may be trained and then built into an AI engine to perform hardware failure prediction, such as memory failure prediction (MFP). The AI model may be trained using hardware performance and failure data collected from a large number of servers running over an extended period of time. Preferably, the AI model is trained in a separate computer environment, such as a computer lab that has substantial processing capacity and access to large amounts of historical hardware performance data. The trained AI model may then be incorporated into an AI engine that can be run in the BMC and/or the Smart NIC. Accordingly, the BMC may regularly pull memory performance data and then run the AI engine against the memory performance data to predict a possible or potential memory failure. However, running the AI engine on the BMC in this manner may consume a substantial amount of the BMC's CPU resource and memory resource, especially on a high-end server which is memory-rich, and may negatively impact the performance of other management functions such as thermal control, sensor monitoring, installing firmware updates, and federation on the BMC.

In some embodiments, the BMC may obtain memory performance data from a memory device, memory module, or memory controller. For example, the BMC may pull or read memory performance data from a memory register on the memory device, memory module, or memory controller. Optionally, the BMC may periodically obtain the memory performance data at regular or irregular intervals or in response to detecting a certain event. In one option, the BMC may dynamically adjust the frequency at which the BMC pulls the memory performance data from the memory register depending upon an interval at which the memory performance data is needed or requested by the Smart NIC running the software application, which may include a memory failure prediction AI engine within a container. Furthermore, the BMC may pull the memory performance data or other hardware performance data in response to receiving a request for memory performance data or other hardware performance data from the Smart NIC. Although the BMC may be responsible for performing system hardware failure prediction, especially including memory failure prediction (MFP), the actual performance of the hardware failure prediction may be offloaded to the Smart NIC to reduce the load on the BMC. Memory failure is one of the main reasons causing a server to shut down. As a result, the ability to predict memory failures and take proactive actions that prevent a server shut down is highly valuable.

In some embodiments, the Smart NIC may include a general-purpose central processing unit (CPU) that is capable of running the software application to analyze the hardware performance data provided by the baseboard management controller and return a hardware failure alert. Furthermore, the Smart NIC may include memory to support the storage and operation of the software application, as well as the storage of data. For example, the memory may store the container received from the BMC and some or all of the hardware performance data received from the BMC. Optionally, the BMC and the Smart NIC may communicate over a direct connection, perhaps using a network controller sideband interface (NC-SI) or a Management Component Transport Protocol (MCTP) to transfer the hardware performance data and/or the container with the software application from the BMC to the Smart NIC and/or hardware failure prediction results or output from the Smart NIC to the BMC. Furthermore, the general-purpose CPU of the Smart NIC may perform processes or tasks received from both the BMC CPU and the host server CPU. For example, the Smart NIC CPU may perform processes like routing, network address translation, telemetry, loading balancing and firewalling on behalf of the host server CPU and may also perform processes like the software application (such as a MFP AI engine) on behalf of the BMC CPU. Accordingly, the BMC CPU and the host server CPU may share the use of the Smart NIC CPU and related resources to reduce their own processing workload. One nonlimiting example of a general-purpose CPU of the Smart NIC is an Advanced RISC Machine (ARM), where RISC stands for a reduced instruction set computer.

In some embodiments, the operations may further include discovering the smart network interface controller that is installed in the server. If the BMC discovers that a Smart NIC is present within the server, the BMC may then send the container with the software application to the Smart NIC and cause the Smart NIC to run the software application within the container. For example, the BMC may send the container to the Smart NIC in response to discovering the presence of the Smart NIC in the same server as the BMC.

In some embodiments, the operations may further include sending a notification to a host device or user identifying a unit of hardware that is subject to the hardware failure alert. The BMC may direct the notification to a host device and/or a user, where the notification identifies the predicted failure of a specific hardware device. Accordingly, the host device and/or the user may take steps to repair or replace the affected hardware, or perhaps redirect workload away from the identified hardware device. Nonlimiting examples of a notification may include an alert (audible or visual) or a message (text, email, popup, banner, etc.).

In some embodiments, the software application may be performed on the BMC during a first period of time and the same software application may be subsequently performed on the Smart NIC during a second period of time. For example, the software application, such as an AI engine stored in BMC firmware, may be performed on the BMC during a first period of time prior to the BMC detecting the presence of a Smart NIC within the server. However, the software application may be subsequently copied to a Smart NIC and performed on the Smart NIC during a second period of time after the BMC has detected the presence of the Smart NIC and provided the software application to the Smart NIC. Optionally, the Smart NIC may be in the form of an option card that may be installed within an expansion slot of the server. Accordingly, a Smart NIC may be installed in a server having a BMC that is experiencing heavy workloads such that the BMC is then able to offload some of its workload. In some embodiments, the BMC and the Smart NIC may each perform the software application, during different time periods, to analyze hardware performance data for the hardware devices installed in the server and generate a hardware failure alert.

Some embodiments provide a method comprising a baseboard management controller accessing a container stored in firmware of the baseboard management controller, wherein the container includes a software application for performing hardware failure prediction. The method further comprises the baseboard management controller copying the container to a smart network interface controller, wherein the baseboard management controller and the smart network are installed in a server. Still further, the method comprises the baseboard management controller periodically obtaining hardware performance data for hardware devices installed in the server, the baseboard management controller providing the hardware performance data to the smart network interface controller, and the smart network interface controller running the software application to analyze the hardware performance data provided by the baseboard management controller and generate a hardware failure alert. In addition, the method comprises the baseboard management controller receiving the hardware failure alert from the smart network interface controller, and the baseboard management controller outputting a user notification identifying at least one of the hardware devices that is subject to the hardware failure alert. In one option, the software application may be an artificial intelligence engine having an artificial intelligence model has been trained for memory failure prediction. In another option, the method may further include the baseboard management controller discovering the smart network interface controller that is installed in the server, wherein the container is copied to the smart network interface controller in response to discovering the smart network interface controller.

The foregoing method may further include any one or more operations described in reference to a computer program product. Similarly, the foregoing computer program products may further include program instructions for implementing or initiating any one or more aspects of the methods described herein.

Embodiments of the system, method and computer program product may be implemented to improve the functioning of technology, such as improvements in the functioning of the computer itself. For example, the offloading of a task from the BMC to the Smart NIC may enable the BMC to better use its capacity to monitor and control the operation of the server. Also, the offloading of tasks to the Smart NIC means that additional and heavy-workload tasks may be performed by and/or for the BMC without causing a degradation in the performance of other tasks for which the BMC is responsible.

FIG. 1 is a diagram of a system 10 including a server 20 that has a baseboard management controller (BMC) 30 in communication with a smart network interface controller (Smart NIC) 40. The server 20 further includes server hardware 22, such as a central processing unit (CPU) or processor, memory, QuickPath Interconnect (QPI), Platform Controller Hub with Management Engine (PCH+ME), and other hardware components, models, types and architectures without limitations. The BMC 30 may communicate with the server hardware 22 via a link 24, such as Platform Environment Control Interface (PECI) and/or an Advanced Platform Management Link (APML). Furthermore, the BMC 30 may communicate with the Smart NIC 40 via a separate link 26, such as a network controller sideband interface (NC-SI) or a Management Component Transport Protocol (MCTP). NC-SI is an electrical interface and protocol defined by the Distributed Management Task Force (DMTF) that enables connection of a BMC to one or more network interface controllers (NICs) in a server for the purpose of enabling out-of-band system management. For example, the NC-SI allows the BMC to use the network connections of the NIC ports for the management traffic, in addition to the regular host traffic. MCTP is a protocol designed by the DMTF to support communications between different intelligent hardware components that make up a platform management subsystem, providing monitoring and control functions inside a managed computer system. Although embodiments are not limited to memory failure prediction, the system 10 is presented and explained in the context of memory failure prediction but it should be understood that the system may be equally applicable to other types of hardware failure prediction. As long as the BMC can access suitable hardware performance data from the server hardware 22 and a model can be built using a historical hardware error dataset, then the trained AI engine for hardware failure prediction can be substituted into the container stored in the BMC firmware.

An offline data mining system 50 may utilize a historical memory error dataset 52 that is the result of monitoring a large group of servers 54 during an extended period of operation. In this example, the historical memory error dataset 52 is provided to a DIMM Health Assessment Model (DHAM) Builder 56. The resulting DIMM Health Assessment Model (DHAM) may then be stored on a data storage device 58. When it is intended for the BMC 30 to perform memory failure prediction (MFP), the DHAM model is included in an artificial intelligence (AI) engine and packaged in a software container including portions of an operating system that may be required to run the AI engine. A container including the AI engine for memory failure prediction (MFP) and the required portions of the operating system may be referred to as an "MFP container." The MFP container may be sent to the BMC 30 of the server 20 in a firmware loading or update process. The BMC 30 then includes the MFP container 32 stored in BMC firmware.

According to some embodiments described herein, the BMC 30 may discover or detect the presence of the Smart NIC 40 in the same server 20 as the BMC. Accordingly, the BMC 30 may copy, transfer or otherwise move the MFP container 32 to the Smart NIC 40 so that the MFP container may be subsequently run by the Smart NIC 40. Accordingly, the Smart NIC 40 is illustrated as then storing the MFP Container 42, which is further illustrated as including a copy of the DIMM Health Assessment Model (DHAM) 44 and the MFP libraries 46 required to run the DHAM 44.

Periodically, the BMC 30 may obtain memory performance data, such as the corrected and uncorrected memory error data 28, over the connections or links 24 or alternative connections to the server memory, such as random-access memory in the form of a dual in-line memory module (DIMM), or other hardware 22. The BMC may then execute a memory error forwarder or other logic 34 of a BMC process 36 to transfer the memory performance data ("run-time data") to the Smart NIC 40 via the link 26. After the Smart NIC 40 performs memory failure prediction using the MFP container 42, any resulting memory failure prediction ("results") may be returned to the BMC 30 via the link 26. Subsequently, the BMC 30 may send a notification or otherwise expose the memory health status, memory failure prediction and/or memory error event 12 via a BMC web or Redfish interface 14.

Figure 2:
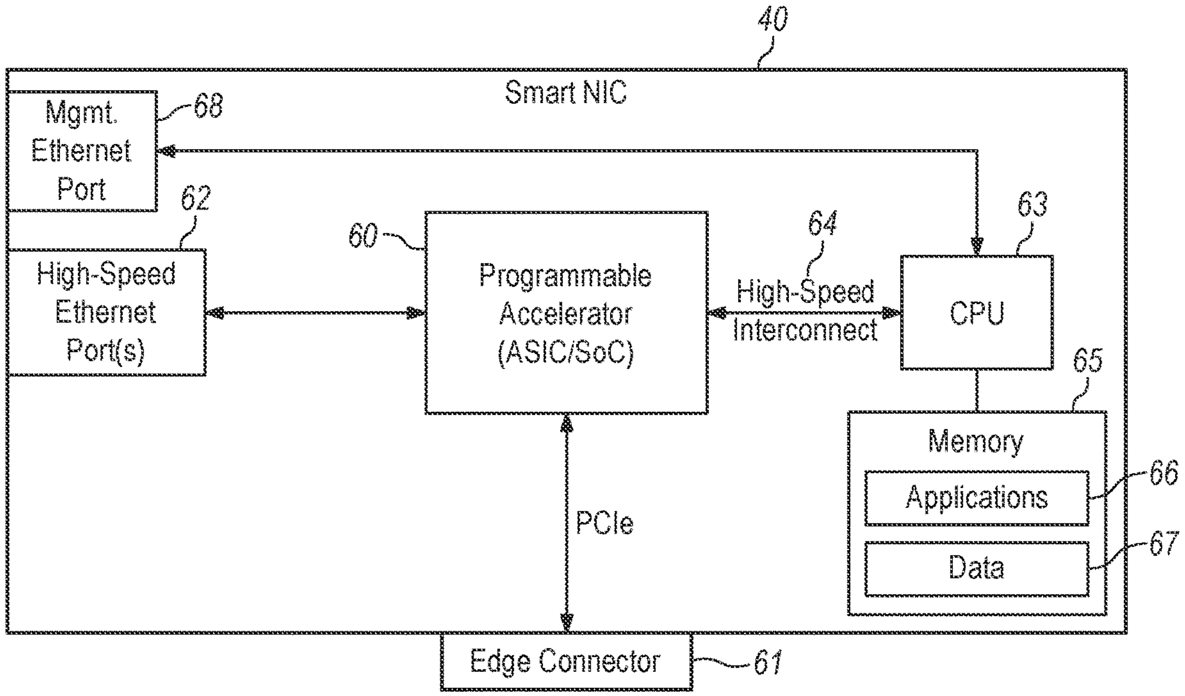
FIG. 2 is a diagram of a Smart NIC according to some embodiments.

FIG. 2 is a diagram of the Smart NIC 40 according to some embodiments. The Smart NIC 40 in the form of an option card including a programmable accelerator 60 that communicates with the server via an edge connector 61. Network traffic may be directed from the programmable accelerator 60 to one or more high-speed Ethernet ports 62. However, the programmable accelerator 60 may offload some functions to the CPU 63 over a high-speed interconnect 64. The CPU 63 may process tasks with the support of memory 65, which may store applications 66 (such as the MFP container) and data 67 (such as memory performance data). While the CPU 63 may perform work on behalf of the programmable accelerator 60, the CPU 63 may also run an MFP container to perform memory failure prediction (MFP) on behalf of the BMC. Accordingly, result of the memory failure prediction may be output to the BMC via a management Ethernet port 68. container to perform memory failure prediction (MFP) on behalf of the BMC. Accordingly, result of the memory failure prediction may be output to the BMC via a management Ethernet port 68.

Figure 3:
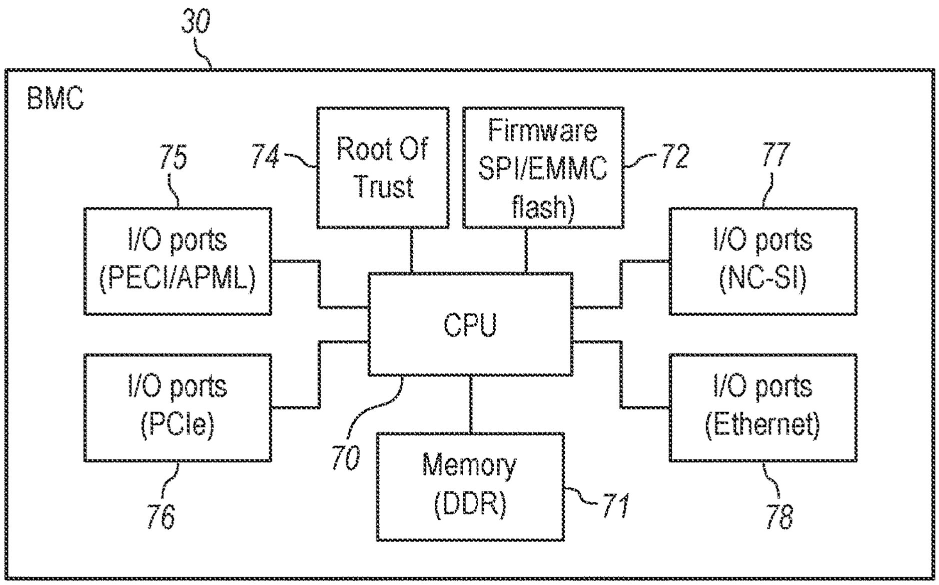
FIG. 3 is a diagram of a baseboard management controller (BMC) according to some embodiments.

FIG. 3 is a diagram of a baseboard management controller (BMC) 30 according to some embodiments. The BMC 30 is similar to a small computer or system on a chip (SoC), including a central processing unit (CPU) 70, memory 71 (such as random-access memory (RAM) on a double data rate (DDR) bus), firmware 72 on a flash memory (such as an embedded multi-media card (eMMC) flash memory or a serial peripheral interface (SPI) flash memory), and a root of trust (RoT) chip 74. The BMC 30 further includes a wide variety of input/output ports. For example, the input/output (I/O) ports may include I/O ports 75 to the hardware components of the server, such as a Platform Environment Control Interface (PECI) port and/or an Advanced Platform Management Link (APML) port; I/O ports 76 to the hardware components of the servers and/or the Smart NIC, such as a Peripheral Component Interconnect Express (PCIe) port; I/O ports 77 to the Smart NIC, such as a network controller sideband interface (NC-SI) port; and I/O ports 78 to a network that accessible to an external user, such as an Ethernet port. Optionally, the output from the BMC 30 to the BMC web or Redfish interface 14 (see FIG. 1) may be routed through the link 26 (see FIG. 1) to the Smart NIC 40 and ultimately to a network (not shown) that is accessible through the high-speed Ethernet ports 62 (see FIG. 2) of the Smart NIC 40.

Figure 4:
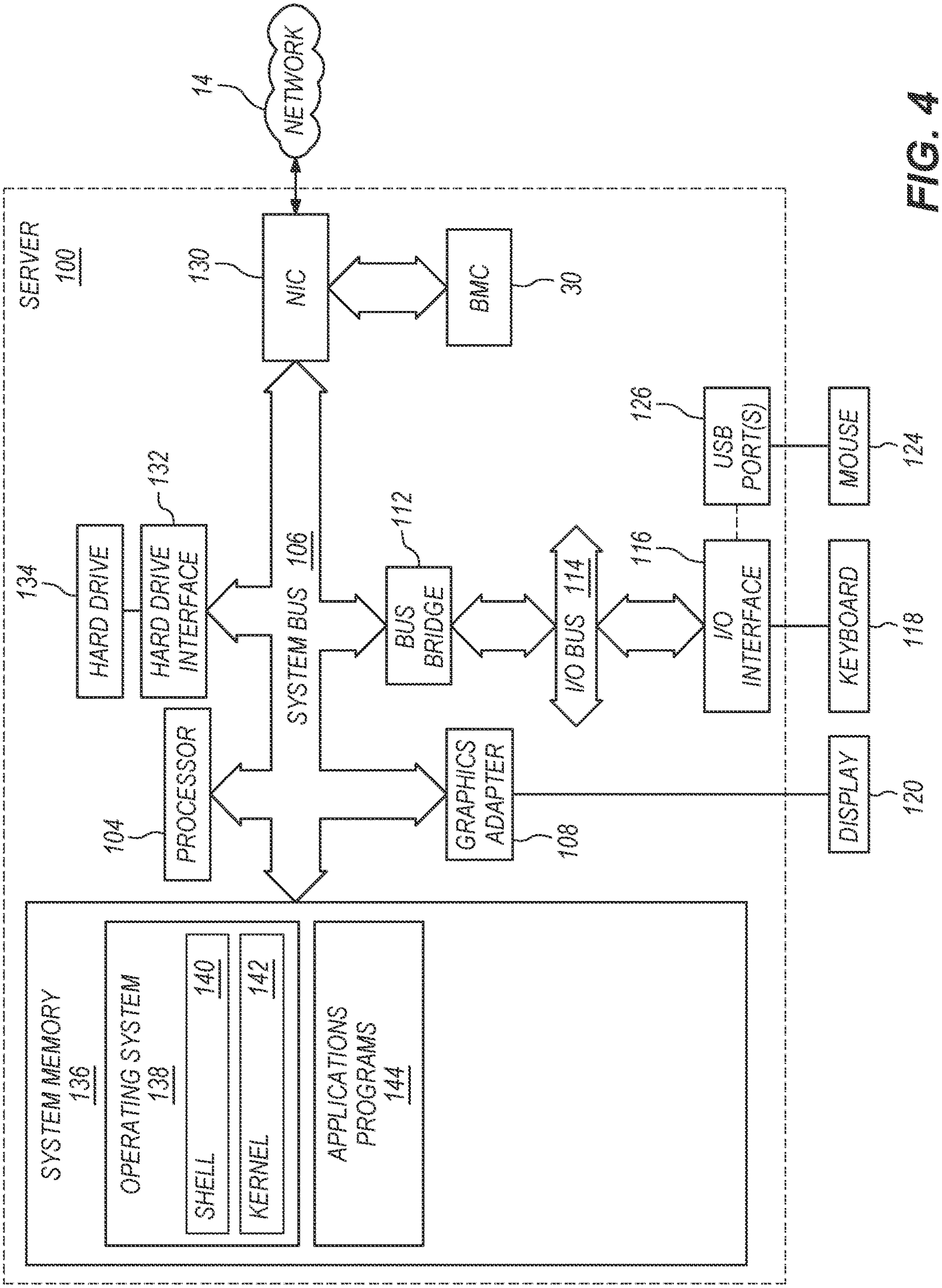
FIG. 4 is a diagram of one embodiment of a server

FIG. 4 is a diagram of one embodiment of a server 100 that may be representative, but not limiting, of the configuration of the server 20 of FIG. 1. The server 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, such as a keyboard 118 (perhaps as a touch screen virtual keyboard), and a USB mouse 124 via USB port(s) 126 (or other type of pointing device, such as a trackpad). As depicted, the server 100 may communicate with other devices over the network 14 using a network adapter or network interface controller (NIC) 130, which may be the Smart NIC 40 (see FIGS. 1 and 2). The hardware elements depicted in the server 100 are not intended to be exhaustive, but rather are representative. For instance, the server 100 may include non-volatile memory and the like.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as the lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include an application program that generates network traffic to and from the network 14 via the NIC 130.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. As shown, the server 100 includes application programs 144 in the system memory of the server 100.

The server 100 further includes the baseboard management controller (BMC) 30. The BMC may be used to perform out-of-band processing and may monitor and manage various features of the hardware components of the server. Furthermore, the BMC 30 may run and/or be responsible for performing memory failure prediction. However, as discussed elsewhere herein, the BMC 30 may move that workload to the NIC 130 if it is a Smart NIC.

Figure 5:
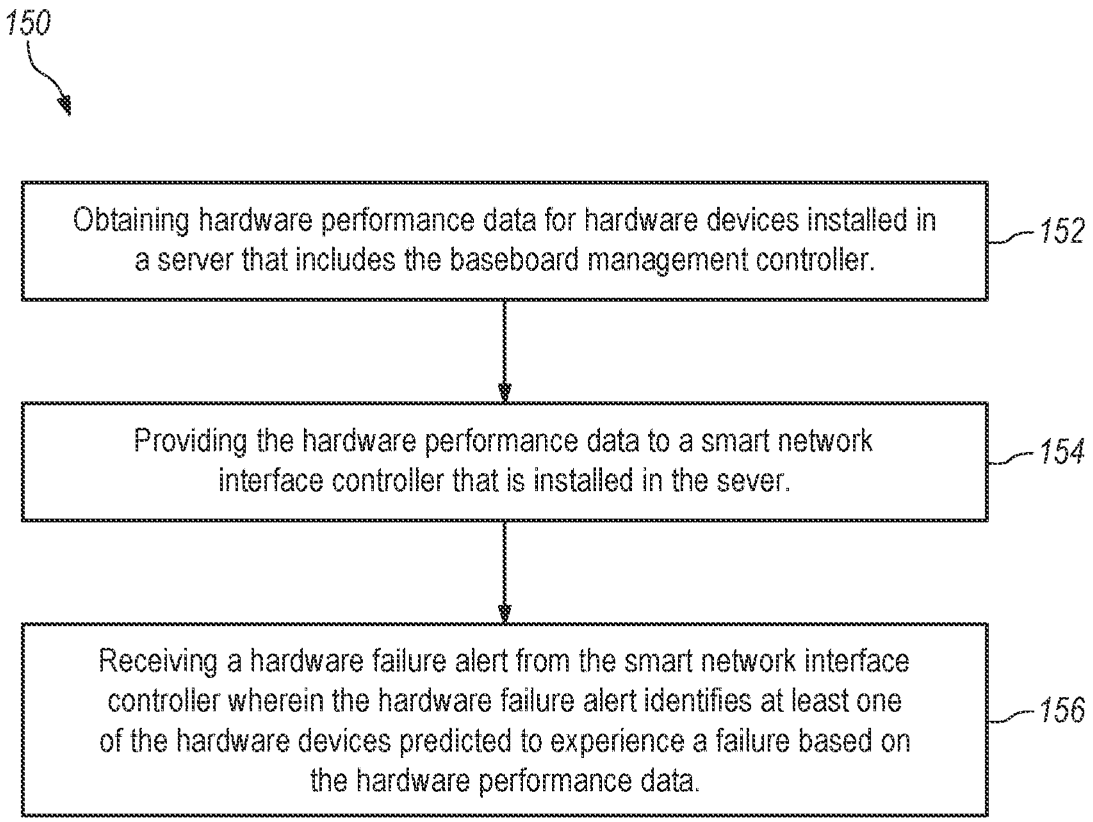
FIG. 5 is a flowchart of operations according to some method or computer program product embodiments.

FIG. 5 is a flowchart of operations 150 according to some method or computer program product embodiments. Operation 152 includes obtaining hardware performance data for hardware devices installed in a server that includes the baseboard management controller. Operation 154 includes providing the hardware performance data to a smart network interface controller that is installed in the server. Operation 156 includes receiving a hardware failure alert from the smart network interface controller, wherein the hardware failure alert identifies at least one of the hardware devices predicted to experience a failure based on the hardware performance data.

Figure 6:
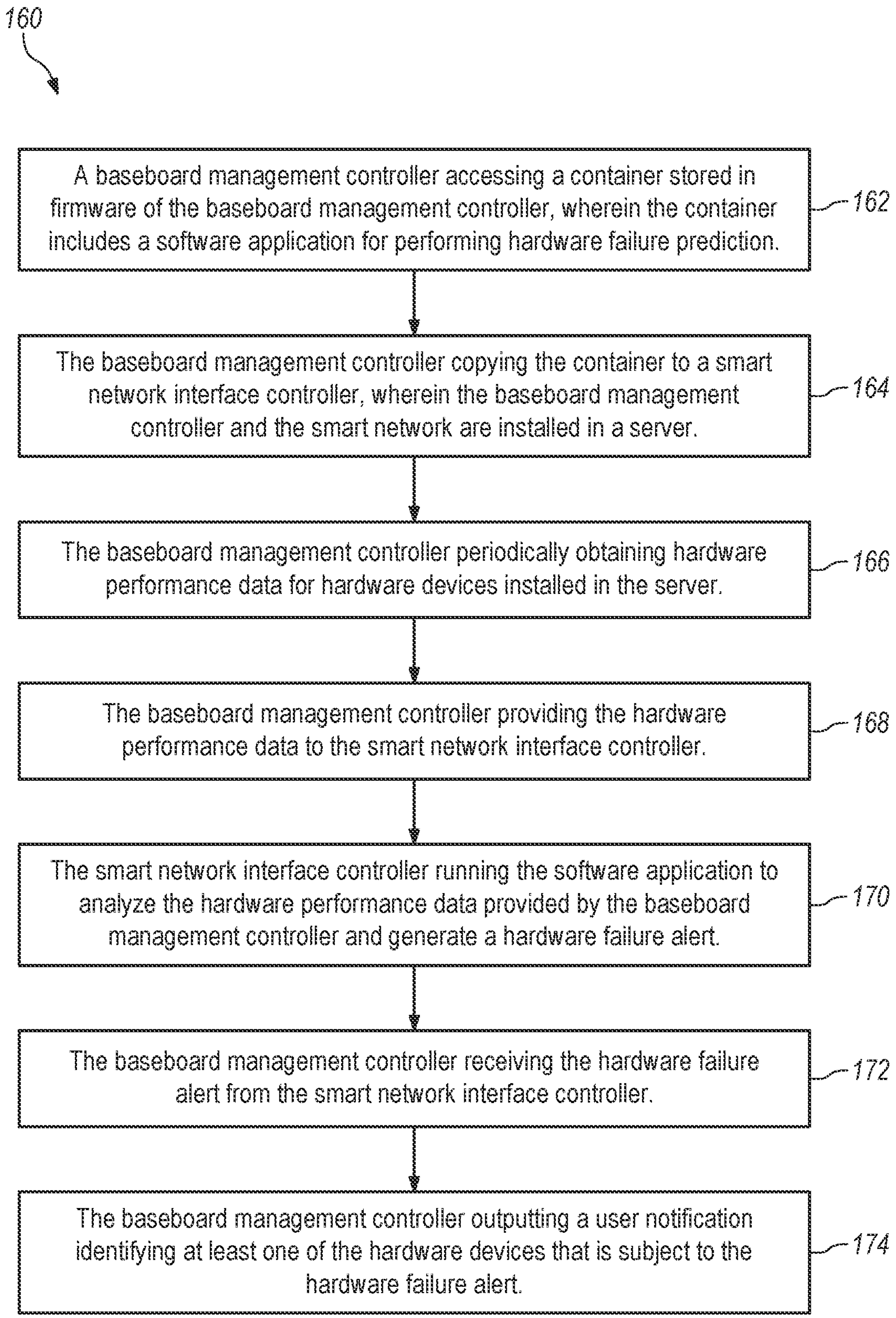
FIG. 6 is a flowchart of operations according to some method or computer program product embodiments.

FIG. 6 is a flowchart of operations 160 according to some method or computer program product embodiments. Operation 162 includes a baseboard management controller accessing a container stored in firmware of the baseboard management controller, wherein the container includes a software application for performing hardware failure prediction. Operation 164 includes the baseboard management controller copying the container to a smart network interface controller, wherein the baseboard management controller and the smart network are installed in a server. Operation 166 includes the baseboard management controller periodically obtaining hardware performance data for hardware devices installed in the server. Operation 168 includes the baseboard management controller providing the hardware performance data to the smart network interface controller. Operation 170 includes the smart network interface controller running the software application to analyze the hardware performance data provided by the baseboard management controller and generate a hardware failure alert. Operation 172 includes the baseboard management controller receiving the hardware failure alert from the smart network interface controller. Operation 174 includes the baseboard management controller outputting a user notification identifying at least one of the hardware devices that is subject to the hardware failure alert.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer readable medium and program instructions embodied therein, the program instructions being configured to be executable by a processor of a baseboard management controller to cause the processor to perform operations comprising:

obtaining hardware performance data for hardware devices installed in a server that includes the baseboard management controller;

providing the hardware performance data to a smart network interface controller that is installed in the server; and receiving a hardware failure alert from the smart network interface controller, wherein the hardware failure alert identifies at least one of the hardware devices predicted to experience a failure based on the hardware performance data.

2. The computer program product of claim 1, the operations further comprising:

accessing a container that includes a software application for performing hardware failure prediction; and copying the container to the smart network interface controller.

3. The computer program product of claim 2, wherein the container is stored in firmware of the baseboard management controller.

4. The computer program product of claim 2, wherein the software application is an artificial intelligence engine having an artificial intelligence model that has been trained for memory failure prediction.

5. The computer program product of claim 2, wherein the smart network interface controller includes a general-purpose central processing unit that is capable of running the software application to analyze the hardware performance data provided by the baseboard management controller and returning the hardware failure alert to the baseboard management controller.

6. The computer program product of claim 1, the operations further comprising:

discovering the smart network interface controller that is installed in the server.

7. The computer program product of claim 1, the operations further comprising:

accessing a container that includes a software application for performing hardware failure prediction; and copying the container to the smart network interface controller in response to discovering the smart network interface controller that is installed in the server.

8. The computer program product of claim 7, wherein the container is accessed from firmware of the baseboard management controller.

9. The computer program product of claim 7, wherein the software application is an artificial intelligence engine having an artificial intelligence model that has been trained for hardware failure prediction.

10. The computer program product of claim 9, wherein the artificial intelligence model has been trained for memory failure prediction.

11. The computer program product of claim 1, wherein obtaining hardware performance data for hardware devices installed in the server includes periodically obtaining the hardware performance data for the hardware devices installed in the server.

12. The computer program product of claim 11, wherein periodically obtaining the hardware performance data for the hardware devices installed in the server includes obtaining the hardware performance data from the hardware devices in response to receiving a request for hardware performance data from the smart network interface controller.

13. The computer program product of claim 11, wherein the hardware modules include memory modules.

14. The computer program product of claim 13, wherein the memory devices include dynamic random-access memory modules.

15. The computer program product of claim 13, wherein periodically obtaining the hardware performance data for the hardware devices installed in the server includes periodically reading, for each of a plurality of memory modules, memory performance data from a memory register on the memory module and/or memory controller.

16. The computer program product of claim 1, the operations further comprising:

sending a notification to a host device identifying a unit of hardware that is subject to the hardware failure alert.

17. The computer program product of claim 3, the operations further comprising:

obtaining, during a separate time period, second hardware performance data for the hardware devices installed in the server;

running the software application to analyze the second hardware performance data; and generating, using the software application, a second hardware failure alert.

18. A method, comprising:

a baseboard management controller accessing a container stored in firmware of the baseboard management controller, wherein the container includes a software application for performing hardware failure prediction;

the baseboard management controller copying the container to a smart network interface controller, wherein the baseboard management controller and the smart network interface controller are installed in a server;

the baseboard management controller periodically obtaining hardware performance data for hardware devices installed in the server;

the baseboard management controller providing the hardware performance data to the smart network interface controller;

the smart network interface controller running the software application to analyze the hardware performance data provided by the baseboard management controller and generate a hardware failure alert;

the baseboard management controller receiving the hardware failure alert from the smart network interface controller; and the baseboard management controller outputting a user notification identifying at least one of the hardware devices that is subject to the hardware failure alert.

19. The method of claim 18, wherein the software application is an artificial intelligence engine having an artificial intelligence model that has been trained for memory failure prediction.

20. The method of claim 18, further comprising:

the baseboard management controller discovering the smart network interface controller that is installed in the server, wherein the container is copied to the smart network interface controller in response to discovering the smart network interface controller.

* * * * *